United States Patent [19]

Lee et al.

[11] 4,168,957

[45] * Sep. 25, 1979

[54] PROCESS FOR PREPARING A SILICON-BONDED POLYCRYSTALLINE DIAMOND BODY

[75] Inventors: Minyoung Lee, Schenectady; Lawrence E. Szala, Scotia; Robert C. De Vries, Burnt Hills, all of N.Y.

[73] Assignee: General Electric Company, Schenectady, N.Y.

[*] Notice: The portion of the term of this patent subsequent to Sep. 11, 1996, has been disclaimed.

[21] Appl. No.: 889,109

[22] Filed: Mar. 22, 1978

Related U.S. Application Data

[62] Division of Ser. No. 844,448, Oct. 21, 1977, Pat. No. 4,124,401.

[51] Int. Cl.² ............................................. C04B 35/56
[52] U.S. Cl. ........................................ 51/309; 51/307; 106/44
[58] Field of Search ................. 51/307, 308, 295, 309; 106/44

[56] References Cited

U.S. PATENT DOCUMENTS

| | | | |
|---|---|---|---|
| 3,239,321 | 3/1966 | Blainey et al. | 51/309 |
| 3,574,580 | 4/1971 | Stromberg et al. | 51/309 |
| 3,850,591 | 11/1974 | Wentorf | 51/309 |
| 3,852,078 | 12/1974 | Wakatsuki et al. | 51/309 |
| 3,912,500 | 10/1975 | Vereschagin | 51/309 |
| 3,913,280 | 10/1975 | Hall | 51/307 |
| 3,982,911 | 9/1976 | Lee | 51/307 |

*Primary Examiner*—Donald J. Arnold
*Attorney, Agent, or Firm*—Jane M. Binkowski; Joseph T. Cohen; Charles T. Watts

[57] ABSTRACT

A mass of diamond crystals in contact with a mass of eutectiferous silicon-rich alloy are disposed in a container and placed within a pressure transmitting powder medium. Pressure is applied to the powder medium resulting in substantially isostatic pressure being applied to the container and its contents sufficient to dimensionally stabilize the container and its contents. The resulting shaped substantially isostatic system of powder-enveloped container is hot-pressed whereby fluid eutectiferous silicon-rich alloy is produced and infiltrated through the interstices between the diamond crystals producing, upon cooling, an adherently bonded integral body.

10 Claims, 6 Drawing Figures

PROCESS FOR PREPARING A SILICON-BONDED POLYCRYSTALLINE DIAMOND BODY

This is a division of application Ser. No. 844,448, filed Oct. 21, 1977, now U.S. Pat. No. 4,124,401.

This invention relates to the production of a polycrystalline diamond body comprised of a dense mass of diamond crystals bonded together by a silicon atom-containing bonding medium.

One of the technical barriers to a high density (high volume of diamond in a body) diamond base compact made below the diamond stable pressure region has been the development of a suitable binder material which will infiltrate the capillaries of a densely packed fine particle size diamond powder. The binder must form a thermally stable strong bond with diamond and should not graphitize or excessively react with the diamond.

The present invention utilizes a eutectiferous silicon-rich alloy which infiltrates well through the capillaries of a compressed mass of diamond crystals and which wets the crystals to form a strong cemented diamond body. The present process also utilizes pressure substantially below those required by the diamond stable region to produce a polycrystalline diamond body in a number of configurations and a wide range of sizes. It is useful as an abrasive, cutting tool, nozzle or other wear-resistant part.

Briefly stated, the present process for preparing a polycrystalline diamond body includes a hot-pressing step and comprises placing within a protective container or cup a mass of solid eutectiferous silicon-rich alloy, or solid components for providing eutectiferous silicon-rich alloy, and a mass of diamond crystals in contact with said solid mass of eutectiferous silicon-rich alloy, or with at least one of said components for providing eutectiferous silicon-rich alloy, said eutectiferous silicon-rich alloy being composed of silicon and a metal which forms a silicide with said silicon, disposing said container and its contents within a pressure transmitting powder medium that transmits applied pressure substantially undiminished and remains substantially unsintered during said hot-pressing, applying sufficient substantially isostatic pressure to said container and its contents via said powder medium to substantially stabilize the dimensions of said container and said contents substantially uniformly producing a shaped substantially isostatic system of powder-enveloped container wherein the density of the resulting compressed mass of diamond crystals is higher than 70% by volume of the volume of said compressed diamond crystals, hot-pressing the resulting substantially isostatic system to produce fluid infiltrating eutectiferous silicon-rich alloy and infiltrate said fluid eutectiferous silicon-rich alloy through the interstices of said compressed mass of diamond crystals, said hot-pressing being carried out at an hot-pressing temperature below 1600° C. under a hot-pressing pressure sufficient to infiltrate said fluid silicon-rich alloy through the interstices of said compressed mass of diamond crystals, said solid eutectiferous silicon-rich alloy, or solid components for eutectiferous silicon-rich alloy being used in an amount sufficient to produce sufficient fluid eutectiferous silicon-rich alloy at said hot-pressing temperature to fill the interstices of said compressed mass of diamond crystals, said hot-pressing being carried out in an atmosphere which has no significant deleterious effect on said diamond crystals or on said infiltrating fluid silicon-rich alloy, said hot-pressing converting less than 5% by volume of said diamond crystals to non-diamond elemental carbon, said non-diamond carbon or the surfaces of said diamond crystals reacting with said fluid infiltrating silicon-rich alloy forming carbide, maintaining sufficient pressure on the resulting hot-pressed substantially isostatic system during cooling thereof to at least substantially maintain the dimensions of said hot-pressed system, and recovering the resulting polycrystalline diamond body comprised of diamond crystals bonded together by a silicon atom-rich containing medium wherein the diamond crystals are present in an amount of at least 70% by volume of the total volume of said body.

In an alternative embodiment of the present process, no protective container or cup is used, and in such embodiment the mass of solid eutectiferous silicon-rich alloy, or solid components for providing eutectiferous silicon-rich alloy, and mass of diamonds are placed directly in a pre-formed cavity of predetermined size in the pressure transmitting powder medium. The cavity can be formed in the powder by a number of techniques. For example, the pressure transmitting powder medium can be placed in a die, a solid mold of desired size can be inserted in the powder, and the resulting system pressed at ambient temperature under pressure sufficient to make the powder stable in form, i.e. give the pressed powder sufficient strength so that the mold can be withdrawn therefrom leaving the cavity it has depressed therein to function as a container for the mass of diamonds and silicon-rich alloy. After the mass of diamonds and silicon-rich alloy are placed within the cavity, additional pressure transmitting powder is added to seal the cavity and the entire system cold-pressed at ambient temperature to dimensionally stabilize the cavity and its contents producing a substantially isostatic system of powder-enveloped cavity and contents.

Those skilled in the art will gain a further and better understanding of the present invention from the detailed description set forth below, considered in conjunction with the figures accompanying and forming a part of the specification, in which.

Figure 2:
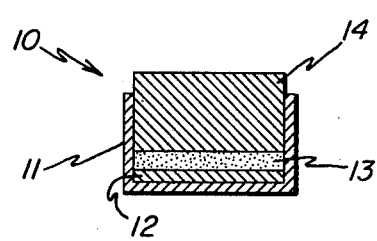
FIG. 2 is a cross-sectional view of a cell, i.e. container and contents, for carrying out infiltration of silicon-rich alloy according to this invention.
Figure 3:
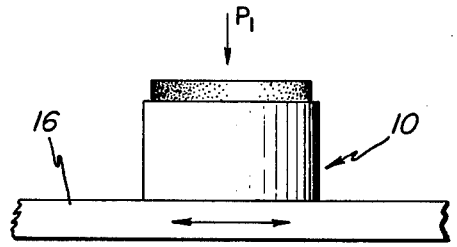
Figure 4:
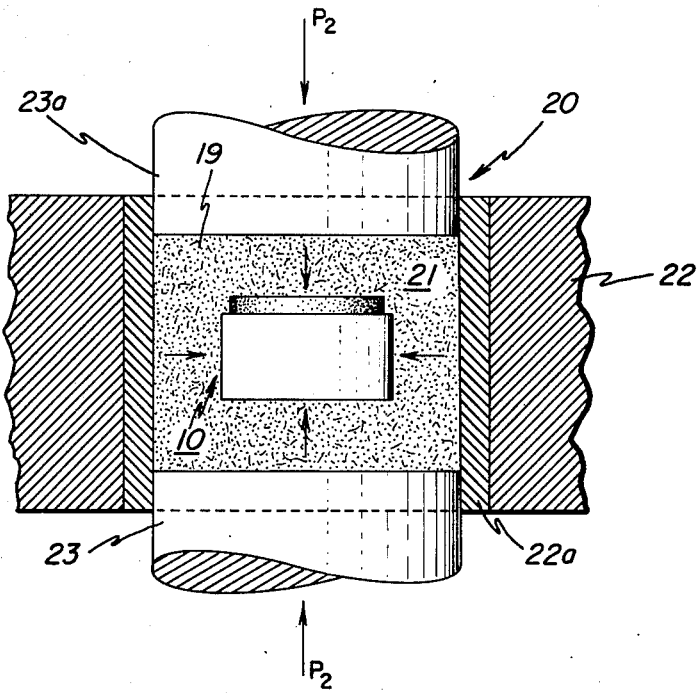
Figure 5:
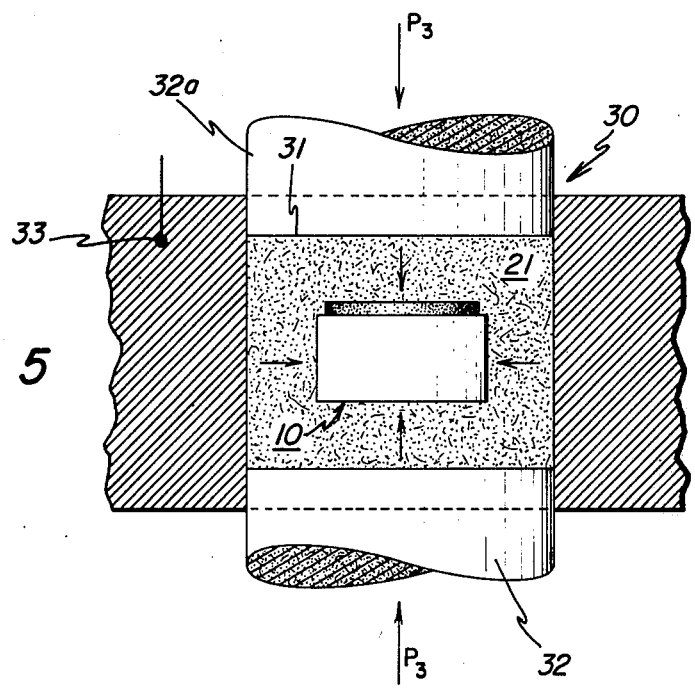
Figure 6:
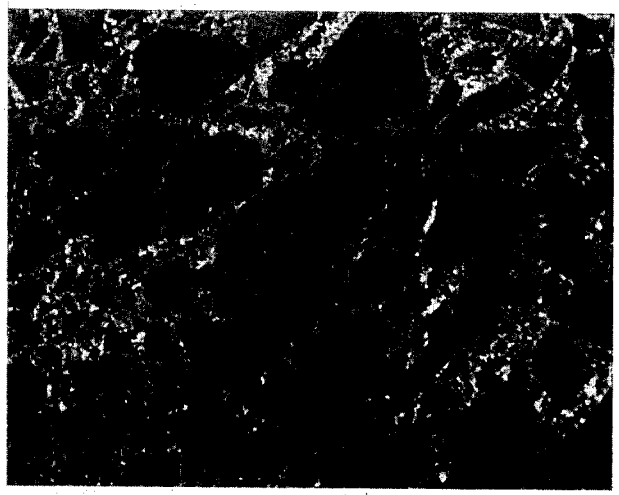

FIG. 3 schematically represents apparatus for applying light pressure to the cell of FIG. 2 while the cell is being vibrated to increase the density of the mass of diamond crystals;

FIG. 4 is a sectional view through an apparatus for applying at least substantially isostatic pressure to the cell by means of a pressure transmitting powder medium to dimensionally stabilize the cell producing a substantially isostatic system;

FIG. 5 is a sectional view through a graphite mold for the simultaneous application of heat and pressure, i.e. hot-pressing, to the substantially isostatic system showing the cell enclosed therein and FIG. 6 is a photograph (magnified 690 X) of a polished cross-section of a polycrystalline diamond body prepared by the present process.

In carrying out the present process, a mass of diamond crystals in contact with a mass of the solid eutectiferous silicon-rich alloy are subjected to a cold-pressing step at ambient or room temperature to substantially stabilize their dimensions substantially uniformly and then to a hot-pressing step whereby the silicon alloy produces fluid silicon-rich alloy which is infiltrated throughout the mass of compressed diamond crystals.

Alternatively, the mass of diamond crystals can be in contact with at least one of the components used for forming the eutectiferous silicon-rich alloy in situ, i.e. silicon or alloying metal, and the mass of diamond crystals as well as the components for forming the silicon-rich alloy, are subjected to a cold-pressing step at ambient or room temperature to substantially stabilize their dimensions and then to a hot-pressing step whereby fluid eutectiferous silicon-rich alloy is produced and infiltrated throughout the mass of compressed diamond crystals. The components for forming the silicon alloy are positioned to form the silicon alloy before hot-pressing is initiated, i.e. before the hot-pressing temperature is reached.

The mass of diamond crystals and mass of starting solid silicon-rich alloy, or solid components for forming the silicon-rich alloy, can be in a number of forms. For example, each mass can be in the form of a layer with one layer superimposed on the other layer. Alternatively, the starting silicon-rich alloy can be in the form of a tube or cylinder with a core extending through it, and the diamond crystals can be packed within the core of the silicon-rich alloy cylinder. In still another embodiment, the starting silicon-rich alloy can be in the form of a bar which can be centrally positioned in the container and the encircling space between the starting silicon-rich alloy bar and the interior wall of the container packed with diamond crystals.

The diamond crystals used in the present process can be natural or synthetic, i.e. man-made. They range in size in largest dimension from about 1 micron to about 1000 microns, and the particular size or sizes used depends largely on the particular packing or density of diamond crystals desired and also on the particular use of the resulting body. For most abrasive applications, for example, diamond crystals no greater than about 60 microns are preferred. Preferably, to maximize the packing of the diamond crystals in the present process, they should be size-graded to contain a range of sizes, i.e. small, medium and large-sized crystals. Preferably, the size-graded crystals range from about 1 micron to about 60 microns, and preferably within this size range, about 60% to about 80% by volume of the total mass of crystals are of the larger sized portion of the range, about 5% to about 10% by volume are of medium size with the balance constituting the small-sized crystals or particles.

Sizing of the diamond crystals is facilitated by the jet-milling of larger diamond crystals. Preferably, the diamond crystals are chemically cleaned to remove any oxides or other impurities from the surface thereof before use in the present process. This may be accomplished by heating the diamond crystals in hydrogen at about 900° C. for about one hour.

In the present invention the starting solid eutectiferous silicon-rich alloy, i.e. the term alloy herein including intermetallic compound, is comprised of silicon and a metal, i.e. alloying metal, which forms a silicide with the silicon. Preferably, the present eutectiferous silicon-rich alloy is comprised of silicon and a metal selected from the group consisting of cobalt(Co), chromium(Cr), iron(Fe), hafnium(Hf), manganese(Mn), molybdenum(Mo), niobium(Nb), nickel(Ni), palladium(Pd), platinum(Pt), rhenium(Re), rhodium(Rh), ruthenium(Ru), tantalum(Ta), thorium(Th), titanium(Ti), uranium(U), vanadium(V), tungsten(W), yttrium(Y), zirconium(Zr) and mixtures thereof.

The present starting eutectiferous silicon-rich alloy is a solid at room temperature and contains more than 50 atomic % of silicon. Usually, it contains a maximum of about 99.5 atomic % silicon depending largely on the specific effect that the alloying metal has on the resulting silicon-rich alloy. The present starting solid silicon-rich alloy is eutectiferous in that it contains some eutectic structure and can be of hypoeutectic, hypereutectic or of eutectic composition. Using FIG. 1 as an example, the eutectic (2) is an alloy of specific composition which, under equilibrium conditions, on cooling freezes at constant temperature forming a solid of at least two phases, and which on heating melts completely at the same constant temperature, this constant temperature being referred to as the eutectic temperature also given at (2). The eutectic (2) is the composition at which two descending liquidus curves (3) and (4), meet at eutectic point (2), and therefore, it has a lower melting point than its neighboring hypoeutectic or hypereutectic compositions. The liquidus is a curve or line on a phase diagram representing under equilibrium conditions the temperatures at which melting ends during heating of the silicon-rich alloy or freezing begins during cooling thereof. Specifically, the present starting solid eutectiferous silicon-rich alloy is one of the series of alloys on a eutectic horizontal (1), i.e. the horizontal passing through the eutectic point (2), and which extends from any alloy whose composition lies to the left of the eutectic (2) on an equilibrium diagram and which contains some eutectic structure, i.e. hypoeutectic, to any alloy whose composition lies to the right of the eutectic (2) on the equilibrium diagram and which contains some eutectic structure, i.e. hypereutectic alloy.

The starting solid silicon-rich alloy may or not be of the same composition as the infiltrating silicon-rich alloy. If all of the starting solid silicon-rich alloy becomes fluid at the hot-pressing temperature then it will have the same composition as the infiltrating silicon-rich alloy. However, if only a portion of the starting silicon-rich alloy, i.e. hypoeutectic or hypereutectic, becomes fluid at the hot-pressing temperature, the starting alloy does not have the same composition as the fluid infiltrating silicon-rich alloy, and in such instance the infiltrating silicon-rich alloy will be more rich in silicon than the starting hypoeutectic alloy but less rich in silicon than the starting hypereutectic silicon-rich alloy.

Figure 1:
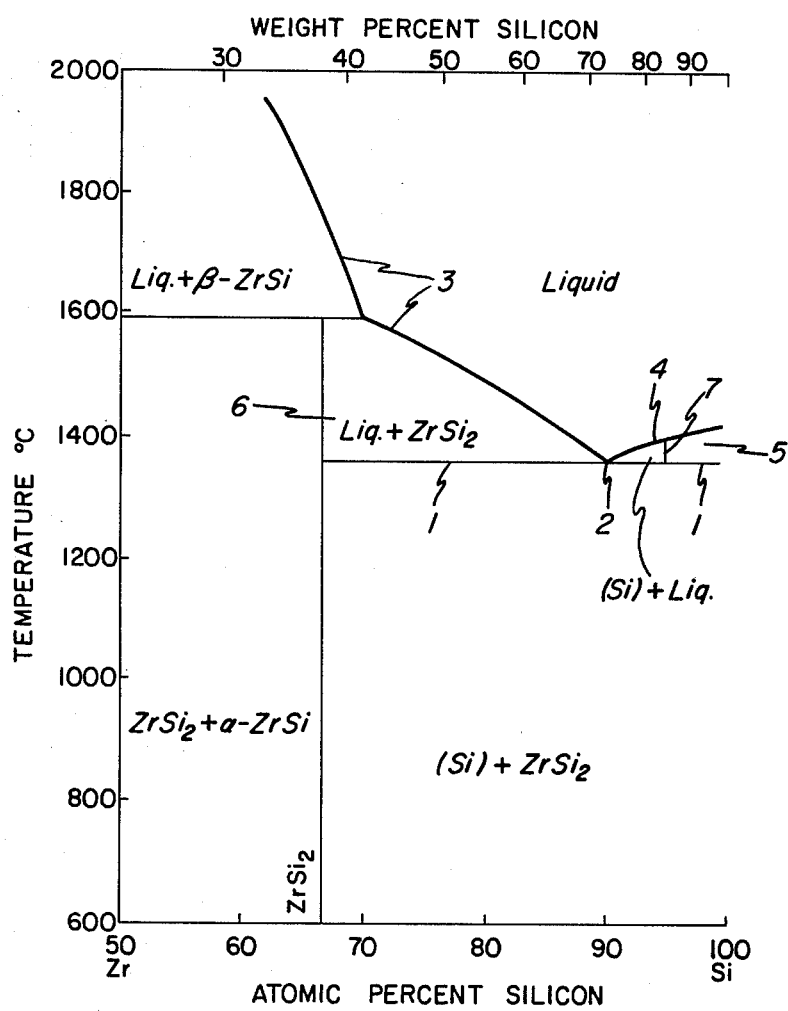
FIG. 1 is a portion of a silicon zirconium alloy phase diagram showing the equilibrium diagram for eutectiferous silicon-rich zirconium alloy useful in the present invention.

Using FIG. 1 as an example, the composition of the present infiltrating eutectiferous silicon-rich alloy and its melting temperature is found on liquidus curves (3) and (4) and includes eutectic point (2). The area (5) defined by (1), (2) and (4) is comprised of a solid phase, (Si) and a liquid phase, i.e. liquid infiltrating alloy phase, with the amount of solid phase increasing and the amount of liquid phase decreasing correspondingly as the distance to the right from eutectic point (2) along horizontal (1) is increased, i.e. as the amount of silicon in the alloy is raised from that contained in the eutectic. Likewise, the area (6) defined by (1), (2) and (3) is comprised of a solid phase $ZrSi_2$ and a liquid phase, i.e.

liquid infiltrating alloy phase, with the amount of solid phase increasing and the amount of liquid phase decreasing correspondingly, as the distance to the left from eutectic point (2) along horizontal (1) is increased, i.e. as the amount of silicon in the alloy is lowered from that contained in the eutectic.

In carrying out the present process, the desired composition of the present infiltrating eutectiferous silicon-rich alloy and its melting temperature are found as a point on the liquidus curves including the eutectic point on the phase diagram for the present silicon-rich alloy, and the hot-pressing temperature is the temperature at which such desired infiltrating silicon-rich alloy composition is fluid, i.e. sufficiently flowable to infiltrate through the compressed diamond mass. When a starting solid silicon-rich alloy is used that has the same composition as that of the desired infiltrating alloy, the hot-pressing temperature is the temperature at which the alloy is fluid which ranges from about 10° C. to preferably a maximum of about 100° C. higher than the melting point of the alloy, but frequently hot-pressing temperatures higher than this preferred maximum are useful depending largely upon the particular alloy used. However, hot-pressing temperatures higher than 1600° C. are not useful since they tend to graphitize the diamonds excessively.

However, when the starting alloy does not have the same composition as that of the desired infiltrating alloy, but when it is heated to the melting point of the desired infiltrating alloy it produces such infiltrating alloy as a liquid phase, then the hot-pressing temperature is a temperature at which such infiltrating alloy phase is produced in fluid form, i.e. about 10° C. higher than the melting point of the infiltrating alloy phase.

Using FIG. 1 as an example, for a specific infiltrating alloy of hypereutectic composition, its melting point is found on liquidus line 4. For example, if the desired infiltrating hypereutectic alloy contains 95 atomic % Si, its melting point is found on liquidus line 4 to be about 1400° C. as shown by line 7. When the starting silicon-rich alloy is of the same composition as the desired infiltrating alloy as shown by line 7, all of the starting alloy would melt at the melting temperature of 1400° C., and the fluid or hot-pressing temperature would range from about 1410° C. to about preferably 1510° C. or if desired, up to but below 1600° C. However, when the starting silicon-rich alloy is any hypereutectic alloy to the right of line 7 on horizontal line 1 in the equilibrium diagram in FIG. 1, the hot-pressing temperature is the temperature at which the desired infiltrating 95 atomic % Si-5 atomic % Zr alloy is produced in fluid from which would be about 1410° C.

Also, at the hot-pressing temperature the starting alloy should produce the desired infiltrating alloy in fluid from in an amount sufficient to fill the voids of the compressed diamond mass herein having a density of crystals higher than 70% by volume. As a practical matter the fluid infiltrating alloy should be produced at hot-pressing temperature in an amount of at least about 1% by volume of the starting silicon-rich alloy.

The present hot-pressing is carried out at a temperature at which the infiltrating silicon-rich alloy is fluid under a pressure which need only be sufficient at the hot-pressing temperature to break up interfacial refractory layers in the diamond mass which prevent penetration by the fluid alloy through the voids thereof and usually this requires a minimum pressure of about 500 psi. Specifically, the hot-pressing pressure can range from about 500 psi to about 20,000 psi, but usually it ranges from about 1000 psi to about 10,000 psi. Hot-pressing pressures in the present process higher than 20,000 psi provide no significant advantage.

By a temperature at which the infiltrating alloy is fluid it is meant herein a temperature at which the infiltrating alloy is readily flowable. Specifically, at its melting point given on the liquidus line, or eutectic point in the case of a eutectic alloy, the infiltrating alloy is a liquid thick viscous substance, but as its temperature is raised from its melting point, the infiltrating alloy becomes less viscous, and at a temperature about 10° C. higher than its melting point, the liquid infiltrating alloy becomes readily flowable, i.e. fluid. The temperature at which the infiltrating silicon-rich alloy is fluid is the temperature at which it will infuse or infiltrate through the capillary-size passages, interstices or voids of the present compressed mass of diamond crystals having a crystal density higher than 70% by volume. With still additional increase in temperature, the flowability of the fluid infiltrating silicon-rich alloy increases resulting in a faster rate of penetration throughout the mass of diamond crystals, and at a temperature of about 100° C. higher than its melting point, the infiltrating alloy usually has its highest flowability and temperatures higher than this maximum ordinarily need not be used.

The present silicon-rich alloy of eutectic composition melts at a temperature below about 1430° C. For the preferred group of silicon-rich alloys herein, the eutectic melting point ranges from 870° C. for SiPd eutectic alloy, i.e. about 56 atomic % Si, to 1410° C. for SiMo eutectic alloy composition, i.e. about 97 atomic % Si. As shown in FIG. 1, the SiZr eutectic alloy (2) contains 90.4 atomic % Si and has a eutectic melting temperature of 1360° C. The major phase of the present solid silicon-rich eutectic alloy is almost pure silicon.

The present infiltrating eutectiferous silicon-rich alloy has a melting point below about 1500° C., usually from about 850° C. to about 1450° C., and the temperature at which it becomes fluid is at least about 10° C. higher than its melting point.

The starting solid silicon-rich alloy or solid components for producing the present silicon-rich alloy can be in the form of a continuous solid or in the form of a powder. The particular amount or volume of starting solid silicon-rich alloy used can vary depending on the amount of liquid infiltrating silicon-rich alloy it produces and the capacity of the equipment. Generally, the infiltrating silicon-rich alloy ranges in amount from about 25% by volume to about 80% by volume, but preferably for best results, it ranges from about 30% to about 60% by volume of the present compressed mass of diamond crystals having a density of crystals higher than 70% by volume.

The present hot-pressing step is carried out in an atmosphere which has no significant deleterious effect on the diamond crystals or infiltrating silicon-rich alloy. Specifically, the hot-pressing step can be carried out in a substantial vacuum or in an inert gas such as argon or helium, or it can be carried out in nitrogen or hydrogen. The present hot-pressing is carried out sufficiently rapidly so that there is no significant reaction between the infiltrating silicon-rich alloy and nitrogen or hydrogen. The hot-pressing step cannot be carried out in air because diamond graphitizes readily in air above 800° C. and the fluid infiltrating silicon-rich alloy would oxidize to form solid silica before any significant infusion by the fluid alloy of the diamond mass occurred.

In the arrangement shown in FIG. 2, cell 10 consists of cup 11 (right circular cylindrical wall with bottom). Within cup 11 are disposed a disc 12 of eutectiferous silicon-rich alloy, a mass 13 of diamond crystals in contact with silicon-rich alloy 12, and a thick plug 14, e.g. a cylinder fitting closely into cup 11 and acting as a closure therefor. If desired, an additional disc of the eutectiferous silicon-rich alloy may be placed intermediate diamond mass 13 and plug 14.

The plug 14 is made of a material which is substantially inert during the hot-pressing step, i.e. it has no significant deteriorating effect on the properties of the present diamond body. Also, it does not form an in situ bond or significantly strong bond with the present diamond body during the present process. Plug 14 may, for example, be formed of a body of compressed hexagonal boron nitride or a metal such as molybdenum. Plug 14 should have sufficient mechanical strength to at least substantially maintain the fluid infiltrating silicon-rich alloy within the container.

Alternatively, instead of plug 14, a cap (not shown) of slightly larger diameter than cup 11 can be fitted over the open end-portion of metal cup 11 to form a closure therefor. Specifically, the cap should form a substantially close fit to at least substantially maintain the fluid silicon-rich alloy within the cup during the hot-pressing step.

Cup 11 and the cap are made of a material which is substantially inert during the hot-pressing step, i.e. a material which has no significant deleterious effect on the properties of the present diamond body. Such a material can be a non-metal, such as compressed hexagonal boron nitride, but preferably, it is a metal, and preferably a metal selected from the group consisting of tungsten, yttrium, vanadium, tantalum and molybdenum.

No free space should be left within the container or plugged cup which would allow an intermixing or free movement of the contents therein so that the contents, at least substantially as initially positioned, are subjected to the substantially isostatic pressure of the cold-pressing step.

The purpose of using size-graded diamond crystals is to produce maximum packing of the diamond crystals. Alternatively, or in addition thereto, the arrangement shown in FIG. 3 is useful for increasing the density or packing of the diamond crystals. Specifically, cell 10 is placed on vibrating table 16 and held there under light pressure (about 50 psi) application during the vibration of cell 10 to promote rearrangement of the diamond crystals or particles to fill spaces and decrease void content in order to increase the density of the diamond mass to greater than 70% by volume of the diamond mass. The requisite degree of consolidation is determinable by independent testing on diamonds of the same size in a fixed dimension die.

Cell 10 is subjected to a cold-pressing step as shown in FIG. 4 which is carried out at room or ambient temperature whereby only sufficient pressure need be applied to produce a dimensionally stabilized substantially isostatic system. Specifically, cell 10 is placed in the cylindrical core of pressure mold 20 surrounded by mass 19 of very fine particles, preferably −400 mesh, and more preferably ranging in size from about 2 microns to about 20 microns, of a pressure transmitting powder medium which remains substantially unsintered under the pressure and temperature conditions of the present process such as hexagonal boron nitride and silicon nitride. This pressure transmitting particulate or powder medium provides for the application of approximately or substantially isostatic pressure to cell 10, whereby cell 10 and its contents are dimensionally stabilized, i.e. densified, substantially uniformly producing a shaped substantially isostatic system of powder enveloped-cell wherein the density of the resulting compressed layer of crystals is higher than 70% by volume of the volume of compressed crystals. Pressure mold 20 (ring 22 and pistons 23, 23a) may be made of tool steel and, if desired, ring 22 may be supplied with a sintered carbide sleeve 22a as shown to permit the application of pressures as high as 200,000 psi. Pressures higher than 200,000 psi provide no significant advantage. Within the confines of piston 23, sleeve 22a and piston 23a, pressure preferably in the range of from about 20,000 psi up to about 100,000 psi, and usually up to about 50,000 psi, is exerted on the pressure transmitting powder medium by the pistons actuated in the conventional manner until the applied pressure becomes stabilized as is done in conventional powder packing technology.

Specifically, the particular applied cold-pressing pressure used is determinable empirically and a pressure higher than that pressure which produces a dimensionally stabilized substantially isostatic system produces no significant additional densification or dimensional stabilization of cell 10 and its contents.

The nature of present pressure transmitting powder medium, such as hexagonal boron nitride and silicon nitride, is such that it results in an approximation of a hydrostatic action in response to the uniaxially applied pressure to exert substantially isostatic pressure over the entire surface of cell 10. It is assumed that the applied pressure is transmitted substantially undiminished to cell 10. The cold-pressing step diminishes the size of the voids to maximize the presence of capillary-size voids in the diamond mass, and it is useful in producing the required density of diamond crystals in excess of 70% by volume of the diamond mass. This reduction in void volume also reduces the ultimate content of non-diamond material in the diamond mass and provides more juxtaposed crystal-to-crystal areas properly located for effective bonding together.

After completion of this cold-pressing step, the density of the compressed diamond crystals in cell 10 should be in excess of 70% by volume of the volume of crystals. Specifically, the density of the compressed layer of mass of diamond crystals ranges from about 71% up to about but less than 95% by volume, and frequently from about 75% to about 90% by volume of the volume of diamond crystals. The higher the density of the crystals, the less will be the amount of non-diamond material present between the crystals resulting in a proportionately harder diamond body.

The substantially isostatic system 21 of powder-enveloped container resulting from the cold-pressing step is then subjected to a hot-pressing step whereby it is subjected to a hot-pressing temperature and pressure simultaneously.

Specifically, when the cold-pressing step is completed, either one of pistons 23, 23a is withdrawn and the resulting consolidated substantially isostatic shaped system 21 is forced out of liner 22a and into a hole of identical diameter in graphite mold 30, the transferred system 21 now being contained within the wall of hole 31 between graphite pistons 32, 32a. Graphite mold 30 is provided with thermocouple 33 to provide an indication of the temperature being applied to the dimensionally-stabilized substantially-isostatic system 21. The mold 30, with the substantially-isostatic system 21 so contained, is placed inside a conventional hot-pressing furnace (not shown). The furnace chamber is evacuated or at least substantially evacuated causing evacuation of system 21 including cell 10, providing system 21 and cell 10 with a substantial vacuum in which the hot-pressing step can be carried out. However, if desired, at this point, nitrogen, or hydrogen, or an inert gas such as argon can be fed into the furnace chamber as well as system 21 including the interior of cell 10 with a suitable hot-pressing atmosphere. While pistons 32, 32a apply a uniaxial pressure, i.e. the hot-pressing pressure, to system 21, the temperature thereof is raised to a temperature at which silicon-rich alloy disc 12 produces fluid infiltrating silicon-rich alloy.

In the hot-pressing step the hot-pressing temperature should be reached quickly and held at such temperature under the hot-pressing pressure usually for at least about one minute to insure satisfactory infiltration through the interstices of the diamond crystal mass. Generally, a hot-pressing time period ranging from about 1 minute to about 5 minutes is satisfactory. Since conversion of diamond to non-diamond elemental carbon depends largely on time and temperature, i.e. the higher the temperature and the longer the time at such temperature the more likely the conversion to non-diamond elemental carbon, the hot-pressing step must be carried out before 5% by volume of the diamond is converted to non-diamond elemental carbon and this is determinable empirically. Conversion of 5% or more by volume of diamond to non-diamond elemental carbon is likely to result in elemental non-diamond carbon phase being left in the final product which would have a significantly deleterious effect on its mechanical properties.

In the hot-pressing step the application of the hot-pressing pressure to the fluid infiltrating silicon-rich alloy breaks up interfacial refractory layer or slag, largely oxide as well as carbide, which usually forms between fluid silicon-rich alloy and diamond surfaces exposing the capillary void system to the silicon-rich alloy, after which infusion by capillary action occurs. Tests have shown that unless sufficient pressure is applied and maintained throughout hot-pressing to system 21 when the silicon-rich alloy is fluid to break up the slag, infusion of the diamond mass by the silicon-rich alloy will not occur.

During hot-pressing, as the fluid silicon-rich alloy infiltrates and flows through the diamond mass, it encapsulates the surfaces of the compressed diamond crystals reacting with the diamond surfaces, or any non-diamond elemental carbon which may form to produce a carbide which at least in major amount and usually in substantial amount is silicon carbide. The resulting product is an integral well-bonded polycrystalline body.

It is during this hot-pressing step that it is particularly important that substantially isostatic conditions be maintained so that when the silicon-rich alloy is converted to the fluid state, this fluid will not be able to pass between mass 13 and cup 11 and escape to any significant extent, but will be forced to move throughout the mass 13 of diamond crystals.

When the hot-pressing step is completed, at least sufficient pressure should be maintained during cooling of the hot-pressed system 21 so that hot-pressed cell 10 is subject to substantially isostatic pressure sufficient to preserve its dimensional stability. Preferably, hot-pressed system 21 is allowed to cool to room temperature. Hot-pressed cell 10 is then removed from the system, and the present diamond body is recovered. Adherent metal, if any, from the protective container and any squeezed out excess silicon alloy at the outside surfaces of the polycrystalline diamond body can be removed by conventional techniques such as grinding.

When the present process is carried out with the silicon-rich alloy and mass of diamond crystals in the form of layers superimposed on each other, the resulting product can have at least one flat face and can be in a number of forms such as a disc, square or rectangle rod or bar.

When the present process is carried out with the silicon-rich alloy in the form of a tube or a cylinder with a core or hole extending through it and the diamond particles are packed in the core, silicon-rich alloy infiltrates through the core of the compressed diamond crystals during hot-pressing producing the present diamond body in the form of a circular bar.

When the present process is carried out with a bar of silicon-rich alloy centrally positioned in the metal cup and the space between the silicon-rich alloy bar and cup packed with diamond crystals, silicon-rich alloy infiltrates through the encircling mass of diamond crystals producing the present diamond body in the form of a tube or hollow cylinder.

The present polycrystalline diamond body is comprised of a mass of diamond crystals adherently bonded to each other by a silicon atom-containing bonding medium, said diamond crystals ranging in size from about 1 micron to about 1000 microns, the density of said diamond crystals ranging from at least about 70% by volume up to about but less than 90% by volume and frequently about 89% by volume of said body, said silicon atom-containing bonding medium being present in an amount ranging up to about 30% by volume of said body, said bonding medium being distributed at least substantially uniformly throughout the polycrystalline diamond body, the portion or surface of said bonding medium in contact with the surfaces of the bonded diamonds being at least in major amount silicon carbide, i.e. more than 50% by volume of the portion or surface of the bonding medium in direct contact with the surfaces of the diamond crystals is silicon carbide. Preferably, the portion or surface of said bonding medium in contact with the surfaces of the bonded diamonds is at least in substantial amount silicon carbide, i.e. at least about 85% by volume and preferably 100% by volume of the bonding medium in direct contact with the surfaces of the bonded diamond crystals is silicon carbide. The present diamond body is pore-free or at least substantially pore-free.

The present silicon atom-containing bonding medium always contains silicon carbide. In one embodiment the present bonding medium is comprised of silicon carbide and metal silicide. In another embodiment the present bonding medium is comprised of silicon carbide, metal silicide and elemental silicon. In yet another embodiment, the present bonding medium is comprised of silicon carbide, metal silicide and metal carbide. In yet another embodiment, the present bonding medium is comprised of silicon carbide, metal silicide, metal carbide and elemental silicon. In still another embodiment, the present bonding medium is comprised of silicon carbide, metal carbide and elemental silicon. The metal components of the metal silicide and metal carbide in the present bonding medium are produced by the alloying metal or metals present in the infiltrating alloy.

The metal component of the metal silicide present in the bonding medium is preferably selected from the group consisting of cobalt, chromium, iron, hafnium, manganese, rhenium, rhodium, ruthenium, tantalum, thorium, titanium, uranium, vanadium, tungsten, yttrium, zirconium and alloys thereof.

The metal component of the metal carbide present in the bonding medium is a strong carbide former which forms a stable carbide and is preferably selected from the group consisting of chromium, hafnium, titanium, zirconium, tantalum, vanadium, tungsten, molybdenum and alloys thereof.

The amount of elemental silicon, if any, and silicon carbide in the bonding medium of the present diamond body can vary depending on the extent of the reaction between the surfaces of the diamond crystals and the infiltrating silicon-rich alloy as well as the reaction between non-diamond elemental carbon and infiltrating silicon-rich alloy. Assuming all other factors are equal, the particular amount of silicon carbide present in the bonding medium depends largely on the particular hot-pressing temperature used and the time period at such temperature. Specifically, with increasing time and/or temperature, the amount of silicon carbide increases while the amount of elemental silicon decreases or is reduced to a non-detectable amount. The production of the present body of bonded diamond crystals with a particular desired amount of silicon carbide to attain certain desirable properties, for example, is determinable empirically.

Specifically, the bonding medium will always contain at least a detectable amount of silicon carbide and at least a detectable amount of a silicide and/or carbide of the alloying metal present in the infiltrating alloy. The metal silicide is usually in the form of a disilicide depending upon the particular infiltrating alloy used. The bonding medium may also contain at least a detectable amount of elemental silicon. By a detectable amount of silicon carbide, metal silicide, metal carbide or elemental silicon it is meant herein an amount detectable by selective area diffraction analysis of transmission electron microscopy on a thin section of the present body. Generally, however, the present bonding medium contains silicon carbide in an amount ranging from about 1% by volume to about 25% by volume of the present polycrystalline diamond body and usually metal silicide in at least a detectable amount, and frequently in a minimum amount of about 0.1% by volume of the polycrystalline diamond body. The particular amount of metal silicide present depends largely on the composition of the infiltrating silicon-rich alloy. The metal silicides are hard and also frequently have lower linear thermal expansion coefficients than the metals, or in some instances lower than diamond, as for example rhenium, a desirable property for a phase in a diamond body. The particular amount of silicon carbide and elemental silicon present depends largely on the composition of the infiltrating silicon-rich alloy as well as on the extent of the reaction between the infiltrating silicon-rich alloy and diamond or non-diamond carbon. The particular amount of metal carbide present depends largely on the composition of the infiltrating silicon-rich alloy.

Selective area diffraction analysis of transmission electron microscopy on a thin section of the present polycrystalline diamond body also will show that the portion of the bonding medium in contact with the surfaces of the bonded diamonds is at least in major amount silicon carbide.

The present body of bonded diamond crystals is void or pore-free or at least substantially pore-free, i.e. it may contain voids or pores in an amount less than 1% by volume of the body providing such voids or pores are small, less than 0.5 micron, and sufficiently uniformly distributed throughout the body so that they have no significant deleterious effect on its mechanical properties. The void or pore content of the present body is determinable by standard metallographic techniques such as, for example, optically examining a polished cross-section of the body.

The present diamond body also is free of non-diamond carbon phase in that it does not contain non-diamond elemental carbon phase in an amount detectable by X-ray diffraction analysis.

One particular advantage of the present invention is that the present polycrystalline diamond body can be produced in a wide range of sizes and shapes. For example, the present body can be as wide or as long as one inch or longer. Polycrystalline diamond bodies one inch in length or longer and having the present diamond density are not producible as a practical matter, or are not producible at all, by techniques utilizing the ultra high pressures and temperatures of the diamond stable region due to the limitations of the equipment necessary to sustain the severe pressure-temperature requirements for the necessary period of time, i.e. the equipment is so complex and massive that its capacity is limited. On the other hand, the present polycrystalline diamond body can be as small or as thin as desired, however, it will always be in excess of a monolayer of diamond crystals.

For use as an abrasive, a portion of the present diamond body can be soldered, brazed or otherwise adhered to a suitable support material such as sintered or hot-pressed silicon carbide, sintered or hot-pressed silicon nitride, or a cemented carbide, or a metal such as molybdenum forming a tool insert which, for example, can be held by a tool shank adapted to be held in a machine tool whereby the exposed surface of the diamond body can be used for direct machining. Alternatively, the present polycrystalline diamond body can be mechanically clamped to a lathe tool for direct machining by the exposed surface of the diamond body.

The invention is further illustrated by the following examples where, unless otherwise stated, the procedure was as follows:

Hexagonal boron nitride powder of fine particle size, e.g. ranging in size from about 2 microns to about 20 microns, was used as the pressure transmitting medium.

The equipment used was substantially the same as that shown in FIGS. 4 and 5.

Cold-pressing of the charge was carried out at room temperature as shown in FIG. 4 to about 80,000 psi.

The amount of infiltrating alloy was sufficient to completely infiltrate through the compressed diamond mass.

The infiltrating alloy was of eutectic or substantially eutectic composition except Example 6.

The polycrystalline diamond body was produced in the form of a disc.

Using a hammer and wedge, each disc was fractured substantially in half and the fractured cross-sectional surfaces were examined optically magnified about 100 times under a microscope.

Polishing of the fractured cross-sectional surface of the polycrystalline body was carried out on a cast iron scaife.

Where a particular diamond density is given as percent by volume of the body, it was determined by the standard point count technique using a photomicrograph of the polished cross-sectional surface magnified 690 times and the surface area analyzed was sufficiently large to represent the microstructure of the entire body.

Where the diamond density is given as a range greater than 70% by volume but less than 90% by volume of the polycrystalline body, this range is based on experience, results with similar runs, and the appearance of the polycrystalline body as a whole as well as the appearance of its cross-sectional surfaces, and also, the volume of the recovered cleaned polycrystalline diamond body as compared to the volume of the starting diamond powder on the assumption that less than 5% by volume of the diamond powder had converted to non-diamond elemental carbon phase.

In Examples 1 to 4, 12 and 13, the infiltrating silicon-rich alloy was an alloy of silicon and zirconium formed in situ.

EXAMPLE 1

A cast silicon disc weighing 330 mg was placed within a zirconium sleeve in a molybdenum cup. About 500 mg of fine diamond powder, particle size ranging from 1 micron to about 60 microns with at least 40 weight % of the diamond powder being smaller than 10 microns was packed on top of the silicon disc. A molybdenum cup slightly larger in diameter than the original cup, i.e. the cup containing silicon and diamonds, was placed over the opening of the original cup as a cover.

The resulting container was then packed in hexagonal boron nitride powder as shown in FIG. 4 and the whole charge was pressed at room temperature, i.e. cold-pressed, in a steel die to about 80,000 psi subjecting the container and its contents to substantially isostatic pressure until the pressure became stabilized producing a dimensionally stabilized shaped substantially isostatic system of powder-enveloped container. From previous experiments it was known that in the resulting pressed assembly, i.e. in the resulting shaped substantially isostatic system of powder-enveloped container, the density of the diamond crystals was higher than about 75% by volume of the compressed diamond mass. Also, the amount of silicon present was about 80% by volume of the compressed diamond mass.

The resulting assembly 21 of powder-enveloped container was then hot-pressed, i.e. it was pushed into a graphite mold of the same diameter size as the steel die, as shown in FIG. 5, which was placed within an induction heater. The interior of the container was evacuated and a nitrogen atmosphere introduced therein by evacuating the heater to about 10 torr before back filling it with nitrogen. A pressure of about 5000 psi was applied to the pressed assembly 21 and maintained thereon by the graphite die which was then heated to a temperature of 1500° C. in about 7 minutes by the induction heater. As the assembly was heated, the pressure also went up to about 10,000 psi due to the expansion of the system. When the temperature reached about 1350° C., the piston 23a dropped and the pressure dropped to about 5000 psi indicating that silicon-rich zirconium alloy had formed, become fluid and had proceeded to infiltrate through the compressed diamond mass. The pressure was raised to the maximum hot-pressing pressure of 10,000 psi and when the temperature reached 1500° C., the assembly was maintained at the maximum hot-pressing temperature of 1500° C. under 10,000 psi for 1 minute to insure complete infiltration by the alloy of the smaller capillaries of the compressed diamond mass. The power supply was then turned off but no additional pressure was applied. This provided a firm pressure at high temperature but reduced pressure at low temperature providing adequate geometric stability, i.e. this maintained the dimensions of the hot-pressed assembly until it was sufficiently cool for handling.

The resulting polycrystalline diamond body was recovered by grinding and grit blasting away can metal, i.e. molybdenum cup and remainder of zirconium sleeve, and excess silicon at the outside surface and faces of the body.

The resulting integral polycrystalline diamond body had the shape of a disc about 0.115 inch thick. It appeared to be well infiltrated and bonded.

X-ray diffraction analysis of the cleaned face through which the alloy entered showed it to be comprised of diamond, silicon carbide and elemental silicon, indicating that the silicon carbide and elemental silicon were present in an amount of at least 2% by volume of the body. However, the X-ray diffraction analysis did not detect elemental non-diamond elemental carbon phase.

Examination of the fractured cross-sectional surfaces of the disc showed that the fracture was transgranular rather than intergranular, i.e., it had fractured through the diamond grains rather than along grain boundaries. This indicates that the bonding medium was highly adherent and was as strong as the diamond grains or crystals themselves.

Examination of the fractured surfaces showed them to be pore-free and the bonding medium was uniformly distributed throughout the body.

Examination of the polished cross-sectional surface showed no strings of holes formed from diamond fragment pullout illustrating the strong bonding therein and its usefulness as an abrasive.

The density of the diamond crystals was about 81% by volume of the polycrystalline diamond body.

A photomicrograph of the polished surface, magnified 690 times, showed a white phase. X-ray spectral analysis of this phase showed that it consisted of zirconium and silicon indicating that this phase was zirconium silicide.

EXAMPLE 2

A cast silicon disc weighing 170 mg was placed within a zirconium sleeve in a molybdenum cup. 250 mg of diamond crystals comprised of a mixture of 75% by volume of 230/270 mesh diamond, i.e. less than about 62 microns but greater than 53 microns, and 25% by volume of Grade 3 (Mesh 8000), i.e. about 1–5 microns, diamond powder was packed on the silicon disc. Instead of the metal can cover used in Example 1, a hot-pressed hexagonal boron nitride disc was used as a plug, i.e. plug 14, as shown in FIG. 2.

The resulting plugged cup was then packed in hexagonal boron nitride powder and the whole charge was cold-pressed in the same manner and under the same conditions disclosed in Example 1. From previous experiments it was known that in the resulting pressed assembly, i.e. in the resulting shaped substantially isostatic system of powder-enveloped cup, the density of the diamond crystals was higher than about 75% by volume of the compressed diamond mass. Also, the amount of silicon present was about 80% by volume of the compressed diamond mass. The resulting pressed assembly 21 of powder-enveloped plugged cup was then hot-pressed in the same manner and under the same conditions disclosed in Example 1.

The resulting polycrystalline diamond body was recovered in the same manner as disclosed in Example 1. There was no bonding to the hexagonal boron nitride plug which had no deleterious effect on the polycrystalline diamond body.

The recovered integral polycrystalline body had a uniform shape of a disc, about 0.060 inch thick. It appeared to be well-infiltrated and bonded. It was more uniform in shape that the polycrystalline diamond body produced in Example 1 because the plug 14 provided better geometric stability for the finished body than the metal cap of Example 1.

Examination of the fractured cross-sectional surfaces of the disc showed that the fracture was transgranular rather than intergranular, i.e., it had fractured through the diamond grains rather than along the grain boundaries. This indicates that the bonding medium was highly adherent and was as strong as the diamond grains or crystals themselves.

Examination of the fractured surfaces showed them to be pore-free and the bonding medium was uniformly distributed throughout the body.

Examination of the polished cross-sectional surface showed no strings of holes formed from diamond fragment pullout illustrating the strong bonding therein.

The density of the diamond crystals was about 73% by volume of the body.

The photomicrograph of the polished surface showed the white phase of zirconium silicide.

EXAMPLE 3

The procedure used in this example was the same as that set forth in Example 2 except that the plug 14 was a 0.125 inch thick disc of molybdenum metal.

The molybdenum plug did not bond to the polycrystalline body and had no deleterious effect on it. The molybdenum plug came off easily as the can metal and excess silicon was ground off leaving a polycrystalline diamond body of uniform thickness and with a nice flat face.

Examination of the fractured cross-sectional surfaces of the disc showed that the fracture was transgranular, i.e., it had fractured through the diamond grains rather than along the grain boundaries. This indicates that the bonding medium was highly adherent and was as strong as the diamond grains or crystals themselves.

Examination of the fractured surfaces showed them to be pore-free.

The diamond density was greater than 70% by volume but less than 90% by volume of the polycrystalline diamond body.

EXAMPLE 4

The procedure used in this example was the same as that set forth in Example 2 except that the plug 14 was a 0.125 inch thick disc of sintered aluminum oxide.

The resulting polycrystalline diamond body did not bond to the alumina plug which came off easily as the can metal and excess silicon was ground off leaving a diamond body of uniform thickness and with a nice flat face.

Examination of fractured cross-sectional surfaces of the disc showed that the fracture was transgranular.

This indicates that the bonding medium was highly adherent and was as strong as the diamond grains or crystals themselves.

Examination of the fractured surfaces showed to be pore-free.

The diamond density was greater than 70% by volume but less than 90% by volume of the polycrystalline diamond body.

The invention is further illustrated by Table I. In Examples 5 to 9, no metallic container or liner was used but the equipment used was substantially the same as that set forth in FIGS. 4 and 5. Specifically, to carry out Examples 5 to 9, the hexagonal boron nitride powder was packed into the die of FIG. 4 and a cylinder used as a mold was pressed into the powder. The cylinder was made of cemented metal carbide and was about 0.35 inch in diameter and 0.25 inch in thickness. The axis of the cylinder was approximately lined up with the central axis of the die.

After the cylinder was inserted in the powder, additional hexagonal boron nitride powder was placed in the die covering the cylinder completely, and the resulting powder-enveloped cylinder was pressed at room temperature under a pressure of 50,000 psi. Piston 23a was then withdrawn and piston 23 was used to push the resulting pressed powder-enveloped cylinder partially out of the die.

The exposed portion of the pressed powder was removed leaving the cylinder partially exposed. The cylinder was then withdrawn leaving the cavity it had impressed therein. In Examples 5 to 8, a cast silicon alloy disc of the given composition and thickness having a diameter almost the same as the inner diameter of the cavity was placed in the bottom of the cavity. In Example 9 the cast alloy was crushed into a powder and the powder placed in the bottom of the cavity. A layer of diamond powder of the given size, amount and thickness was packed on top of the alloy.

A disc of hot-pressed hexagonal boron nitride powder of about the same diameter as the inner diameter of the cavity was placed within the cavity on top of the diamond powder as a plug to insure that the surface of the resulting polycrystalline diamond body would be flat.

The entire mass was then pushed into the center of the die by piston 23a which was then withdrawn. An additional amount of hexagonal boron nitride powder was added to the die to cover the hot-pressed disc of hexagonal boron nitride resulting in the cavity and contents being enveloped by hexagonal boron nitride as illustrated by FIG. 4. The resulting charge was then pressed at room temperature, i.e. cold-pressed, in the steel die under a pressure of 80,000 psi as shown in FIG. 4 subjecting the cavity and its contents to substantially isostatic pressure until the pressure became stabilized producing a dimensionally stabilized shaped substantially isostatic system of powder-enveloped cavity and contents. From previous experiments it was known that in the resulting pressed assembly, i.e. in the resulting shaped substantially isostatic system of powder-enveloped cavity and contents, the density of the diamond crystals was higher than 75% by volume of the compressed diamond mass.

The resulting pressed assembly of powder-enveloped cavity and contents, which was substantially the same as 21 except that no metal container was used, was then hot-pressed, i.e. it was pushed into a graphite mold of the same diameter size as the steel die, as shown in FIG.

5, and placed within an induction heater. The interior of the cavity was evacuated and a nitrogen atmosphere introduced therein by evacuating the heater to about 10 torr before back filling it with flowing dry nitrogen. A pressure of about 5000 psi was applied to the pressed assembly and maintained thereon by the graphite die, which was then heated by the induction heater at a rate which reached the given maximum hot-pressing temperature in about 5 to 7 minutes. As the assembly was heated, the pressure increased to the given maximum hot-pressing due to the expansion of the entire system.

At the given temperature at which infiltration began or proceeds the piston and the pressure dropped to about 5000 psi indicating that the given alloy had melted and become fluid and had infiltrated through the diamond mass. The pressure was then raised back to the given maximum hot-pressing pressure where it was maintained at the given maximum hot-pressing temperature for one minute to insure complete infiltration by the alloy of the smaller capillaries of the compressed diamond mass. The power supply was then turned off but no additional pressure was applied. This provided a firm pressure at high temperature but reduced pressure at lower temperature providing adequate geometric stability. At room temperature, the resulting polycrystalline diamond body was recovered.

The plug did not bond to the diamond body. After removing surface scales of hexagonal boron nitride powder and excess alloy by grinding and grit blasting, the resulting integral polycrystalline diamond body had the shape of a disc with the given thickness.

Examples 10 to 13 were carried out in substantially the same manner as Example 1, except as noted in the Table I.

In Table I the hot-pressing temperature at which infiltration begins is that temperature at which the alloy is fluid and proceeds to infiltrate through the compressed diamond mass. The given maximum hot-pressing temperature and maximum hot-pressing pressure were maintained simultaneously for one minute to insure complete infiltration of the smaller capillaries of the compressed diamond crystal mass.

In Examples 5 to 10 of Table I, the recovered polycrystalline diamond body was in the form of a disc.

X-ray analysis given in Table I was made on the polycrystalline diamond body is crushed form.

TABLE I

| Ex. | Infiltrating Alloy Atomic % | Amt. (mg) | Thickness Approx. (in) | Diamond Powder Size (micron) | Amt. (mg) | Approx. Pwdr. Thickness(in) | Metal Container if any | Plug | Max. Hot-Pressing Pressure (psi) | Hot-Pressing Temp.(°C.) Infiltration Begins | Max. Temp. |
|---|---|---|---|---|---|---|---|---|---|---|---|
| 5 | 90A/oSi 10A/oRe | 264 | .040 | 1μ to 60μ size at least 40w/o is smaller than 10μ | 264 | .055 | None | Hot-Pressed hexagonal boron nitride powder | 13000 | 1375 | 1485 |
| 6 | 95A/oSi 5A/oRe | 260 | 0.40 | Same as Ex. 5 | 250 | .055 | None | Same as Ex. 5 | 3000 | 1390 | 1495 |
| 7 | 86A/oSi 14A/oTi | 200 | 0.40 | Same as Ex. 5 | 260 | .055 | None | Same as Ex. 5 | 13000 | 1315 | 1410 |
| 8 | 86A/oSi 14A/oTi | 210 | 0.40 | Same as Ex. 5 | 250 | .055 | None | Same as Ex. 5 | 13000 | 1345 | 1540 |
| 9 | 73.5A/oSi 26.5A/oFe | 200 | Pre-Alloyed powder (Crushed after casting) | Same as Ex. 5 | 260 | .055 | None | Same as Ex. 5 | 13000 | 1215 | 1322 |
| 10 | 77.5A/oSi 22.5A/oCo | 300 | 0.40 | Same as Ex. 5 | 300 | .065 | Mo-cup with Zr-liner | Cobalt-cemented tungsten carbide | 11000 | 1200 | 1350 |
| 11 | 68A/oSi 32A/oMn | 193 | .040 | Same as Ex. 5 | 225 | .050 | Same as Ex. 10 | Same as Ex. 10 | 11000 | 1150 | 1375 |
| 12 | cast silicon | 172 | .040 | Same as Ex. 5 | 254 | .055 | Zr-cup Zr-liner | Molybdenum | 13000 | 1350 | 1500 |
| 13 | cast silicon | 146 | .030 | 70w/o of 53-62μ, 30w/o of 1-5μ | 305 | .060 | Mo-cup Zr-liner | Same as Ex. 10 | 13000 | 1350 | 1530 |

| Ex. | Melting Point of Infiltrating Alloy In Literature (°C.) | Polycrystalline Diamond Body Approx. Thickness (inch) | Characteristics | X-ray Analysis |
|---|---|---|---|---|
| 5 | (1125) predicted | .060 | Pore-free, hard and highly abrasion resistant as evidenced by lack of erosion after subjection to jet of silicon carbide particles. | Diamond, SiC, ReSi$_2$ & trace of Si. |
| 6 | (1250) predicted | .060 | Same as Ex. 5 | Diamond, SiC, ReSi$_2$ & trace of Sl. |
| 7 | 1330 | .060 | Fractured surfaces showed pockets, about 100μ in size, of fine diamond powder, less than 2μ in size, were not properly infiltrated;remainder dense, | Diamond, SiC,TiSi$_2$,Si. (Also a trace of ReSi$_2$ believed to be due to contamination). |

TABLE I-continued

| | | | | |
|---|---|---|---|---|
| 8 | 1330 | .060 | well-bonded, hard. Well-infiltrated and well-bonded. | Diamond, SiC, TiSi$_2$. |
| 9 | 1208 | .060 | Fractured surfaces showed same incomplete infiltration as in Ex. 7. | Diamond, SiC, FeSi$_2$. |
| 10 | 1259 (Si, Co binary) | .070 | Diamond body was well-infiltrated but surface in contact with cemented carbide plug was graphitized by the plug. | — |
| 11 | 1145 (Si, Mn binary) | .055 | Diamond body was well-infiltrated and although it did not bond to the carbide plug, the diamond surface in contact with the carbide plug was damaged considerably (graphitized) by the plug. | — |
| 12 | 1360 (Si (Si-9.6A/oZr eutectic) | — | The diamond body was cleaned with silicon carbide particle jet blasting. It showed excellent erosion resistance against this very abrasive jet. Also the surface in contact with Mo-slug did not show any sign of deterioration. | — |
| 13 | Same as Ex. 12 | — | The surface of the diamond body is contact with the cemented carbide plug was badly graphitized but the remainder of the body, i.e. about 2/3 of the body was not affected by the plug. Polished cross-section shows over 70% by volume diamond and the binder alloy had infiltrated into the fine crack, in the large diamond crystals used. | — |

In Examples 5 and 6 the polycrystalline diamond bodies were well-infiltrated and well-bonded. Examination of their fractured surfaces showed them to be pore-free, that the bonding medium was uniformly distributed throughout the body, and that the fractures were transgranular. The diamond density of each body was greater than 70% but less than 90% by volume of the body.

In Example 7 the fractured surfaces showed pockets up to about 100$\mu$ in size of fine diamond powder that were incompletely infiltrated and this was believed due to the nonuniformity of the mixture of diamond crystals. However, the remainder of the body was completely infiltrated and had a density greater than 70% by volume but less than 90% by volume of the body.

Example 8 was carried out in the same manner as Example 7 but higher hot-pressing temperatures were used and these temperatures caused complete infiltration through the compressed diamond mass producing a well bonded, hard disc. Examination of the fractured cross-sectional surfaces showed them to be pore-free, that the bonding medium was uniformly distributed throughout the body and that the fractures were transgranular. Examination of the polished cross-sectional surface of Example 8 showed no strings of holes formed from diamond fragment pullout illustrating the strong bonding therein. The polished cross-sectional surface is shown in FIG. 6, and the density of the diamond crystals was about 80% by volume of the polycrystalline diamond body.

In Example 9, although the fractured surfaces showed the same incomplete infiltration as in Example 7, the remainder of the body was well-infiltrated and well-bonded.

Examples 10, 11 and 13 show that cobalt-cemented tungsten carbide is not useful as a plug in the present process. In each of Examples 10, 11 and 13, examination of the fractured cross-sectional surfacces not affected by the plug showed them to be pore-free, that the fracture was transgranular, that the bonding medium was uniformly distributed throughout, and that each had a diamond density higher than 70% by volume.

In Example 12, examination of fractured cross-sectional surfaces showed them to be pore-free, that the fracture was transgranular, and that the bonding medium was uniformly distributed throughout the body which had a density higher than 70% but less than 90% by volume of the body.

In Example 13, examination of the fractured cross-sectional surfaces showed that the alloy had infiltrated into the fine cracks which may occur in larger crystals during hot-pressing producing exceptionally well-bonding of such crystals.

The following patent and copending applications assigned to the assignee hereof, are incorporated herein by reference.

U.S. Pat. No. 3,982,911 to Lee discloses a process of preparing a composite cubic boron nitride abrasive body by disposing cubic boron nitride crystals together with a substrate and bonding alloy in a protective metal container, placing the container within a pressure transmitting powder medium, applying substantially isostatic pressure to the container and its contents via the powder medium, and hot-pressing the resulting powder-enveloped container.

Ser. No. 787,858 filed Apr. 15, 1977 now U.S. Pat. No. 4,110,084, in the names of Lee et al discloses a process of preparing a cubic boron nitride abrasive composite by disposing cubic boron nitride crystals, aluminum or aluminum alloy and a silicon carbide ceramic substrate in a container, placing the container within a pressure transmitting powder medium, applying substantially isostatic pressure to the container and its contents via the powder medium, and hot-pressing the resulting powder-enveloped container.

Ser. No. 844,447 filed of even date herewith in the names of Lee et al relates to the production of a composite of a polycrystalline diamond body and silicon carbide substrate formed by subjecting a mass of diamond crystals in contact with a mass of silicon-rich eutectiferous alloy and a silicon carbide substrate to substantially isostatic pressure to dimensionally stabilize them, and hot-pressing the resulting system to infiltrate the alloy through the diamond mass and into contact with the substrate.

Ser. No. 844,449 filed of even date herewith in the names of Lee et al relates to the production of a composite of a polycrystalline diamond body and silicon nitride substrate by subjecting a mass of diamond crystals in contact with a mass of eutectiferous silicon-rich alloy and a silicon nitride substrate to substantially isostatic pressure to dimensionally stabilize them, and hot-pressing the resulting system to infiltrate the alloy through the diamond mass and into contact with the substrate.

Ser. No. 844,446 now abandoned filed of even date herewith in the names of Lee et al discloses a polycrystalline diamond body formed by subjecting a mass of diamond crystals in contact with a mass of silicon to substantially isostatic pressure to dimensionally stabilize them, and hot-pressing the resulting system to infiltrate the silicon through the diamond mass.

What is claimed is:

1. A process for preparing a polycrystalline diamond body at pressures substantially below those required by the diamond stable region which includes a hot-pressing step and which comprises:

(a) placing within a protective container or cup a mass of solid eutectiferous silicon-rich alloy, or solid components for providing eutectiferous silicon-rich alloy, and a mass of diamond crystals in contact with said mass of solid eutectiferous silicon-rich alloy, or with at least one of said components for providing eutectiferous silicon-rich alloy, said eutectiferous silicon-rich alloy being composed of silicon and a metal which forms a silicide with said silicon;

(b) disposing said container and its contents within a pressure transmitting powder medium that transmits applied pressure substantially undiminished and remains substantially unsintered during said hot-pressing;

(c) applying sufficient substantially isostatic pressure to said container and its contents via said powder medium to substantially stabilize the dimensions of said container and said contents substantially uniformly producing a shaped substantially isostatic system of powder-enveloped container wherein the density of the resulting compressed mass of diamond crystals is higher than 70% by volume of the volume of said compressed diamond crystals;

(d) hot-pressing the resulting substantially isostatic system to produce fluid infiltrating eutectiferous silicon-rich alloy and infiltrate said fluid eutectiferous silicon-rich alloy through the interstices of said compressed mass of diamond crystals, said hot-pressing being carried out at an hot-pressing temperature below about 1600° C. under a hot-pressing pressure sufficient to infiltrate said fluid silicon-rich alloy through the interstices of said compressed mass of diamond crystals, said solid eutectiferous silicon-rich alloy, or solid components for providing eutectiferous silicon-rich alloy being used in an amount sufficient to produce sufficient fluid eutectiferous silicon-rich alloy at said hot-pressing temperature to fill the interstices of said compressed mass of diamond crystals, said hot-pressing being carried out in an atmosphere which has no significant deleterious effect on said diamond crystals or said infiltrating fluid silicon-rich alloy, said hot-pressing converting less than 5% by volume of said diamond crystals to non-diamond elemental carbon, said infiltrating fluid silicon-rich alloy encapsulating the surfaces of the compressed diamond crystals reacting with the diamond surfaces or any non-diamond elemental carbon producing a carbide which at least in major amount is silicon carbide;

(e) maintaining sufficient pressure on the resulting hot-pressed substantially isostatic system during cooling thereof to at least substantially maintain the dimensions of said hot-pressed system; and (f) recovering the resulting polycrystalline diamond body comprised of diamond crystals bonded together by a silicon atom-rich containing medium wherein the diamond crystals are present in an amount from at least 70% by volume up to but less than 90% by volume of the total amount of said body, said diamond body being at least substantially pore-free and being free of elemental non-diamond carbon phase in that it does not contain non-diamond elemental carbon phase in an amount detectable by X-ray diffraction analysis.

2. The process of claim 1 wherein the diamond crystals are size-graded ranging from about 1 micron to about 60 microns.

3. The process of claim 1 wherein the amount of fluid infiltrating silicon-rich alloy ranges from about 25% by volume to about 80% by volume of said compressed mass of diamond crystals.

4. The process of claim 1 wherein the density of said compressed mass of diamond crystals ranges from about 71% to about but less than 95% by volume of the volume of compressed crystals.

5. The process of claim 1 wherein said mass of solid silicon-rich alloy is in the form of a layer and said mass of diamond crystals is in the form of a layer superimposed on said layer of silicon-rich alloy.

6. The process of claim 1 wherein said mass of solid silicon-rich alloy is in the form of a bar substantially centrally located within said container and said mass of diamond crystals are packed in the encircling space between said solid silicon-rich alloy and said container.

7. The process of claim 1 wherein said mass of solid silicon-rich alloy is in the form of a cylinder having a core extending through it and said mass of diamond crystals is packed within said core of said silicon cylinder.

8. The process of claim 1 wherein said mass of solid silicon-rich alloy is in particulate form.

9. A process for preparing a polycrystalline diamond body at pressures substantially below those required by the diamond stable region which includes a hot-pressing step and which comprises:

(a) pressing a cavity in a pressure transmitting powder medium that transmits applied pressure substantially undiminished and remains substantially unsintered during said hot-pressing;

(b) placing within said cavity a mass of solid eutectiferous silicon-rich alloy, or solid components for providing eutectiferous silicon-rich alloy, and a mass of diamond crystals in contact with said mass of solid eutectiferous silicon-rich alloy, or with at least one of said components for providing eutectiferous silicon-rich alloy, said eutectiferous silicon-rich alloy being composed of silicon and a metal which forms a silicide with said silicon;

(c) covering said cavity and its contents with an additional amount of said pressure transmitting powder medium thereby enveloping the cavity with said pressure transmitting powder;

(d) applying sufficient substantially isostatic pressure to said cavity and its contents via said power medium to substantially stabilize the dimensions of said cavity and its contents substantially uniformly producing a shaped substantially isostatic system of powder-enveloped cavity, wherein the density of the resulting compressed mass of diamond crystals is higher than 70% by volume of the volume of said compressed diamond crystals;

(e) hot-pressing the resulting substantially isostatic system to produce fluid infiltrating eutectiferous silicon-rich alloy and infiltrate said fluid eutectiferous silicon-rich alloy through the interstices of said compressed mass of diamond crystals, said hot-pressing being carried out at an hot-pressing temperature below about 1600° C. under a hot-pressing pressure sufficient to infiltrate said fluid silicon-rich alloy throughout the interstices of said compressed mass of diamond crystals, said solid eutectiferous silicon-rich alloy, or solid components for eutectiferous silicon-rich alloy being used in an amount sufficient to produce sufficient fluid eutectiferous silicon-rich alloy at said hot-pressing temperature to fill the interstices of said compressed mass of diamond crystals, said hot-pressing being carried out in an atmosphere which has no significant deleterious effect on said diamond crystals or said infiltrating fluid silicon-rich alloy, said hot-pressing converting less than 5% by volume of said diamond crystals to non-diamond elemental carbon, said infiltrating fluid silicon-rich alloy encapsulating the surfaces of the compressed diamond crystals reacting with the diamond surfaces or any non-diamond carbon producing a carbide which at least in major amount is silicon carbide;

(f) maintaining sufficient pressure on the resulting hot-pressed substantially isostatic system during cooling thereof to at least substantially maintain the dimensions of said hot-pressed system; and (g) recovering the resulting polycrystalline diamond body comprised of diamond crystals bonded together by a silicon atom-rich containing medium wherein the diamond crystals are present in an amount from at least 70% by volume up to but less than 90% by volume of the total volume of said body, said diamond body being at least substantially pore-free and being free of elemental non-diamond carbon phase in that is does not contain non-diamond elemental carbon phase in an amount detectable by X-ray diffraction analysis.

10. The process of claim 9 wherein said mass of solid silicon-rich alloy is in particulate form.

* * * * *